PULSE SAMPLING DEVICE EMPLOYING MODULATED MULTIVIBRATOR TO SLICE LEADING AND TRAILING EDGES OF INPUT

Filed June 6, 1961 2 Sheets-Sheet 1

INVENTOR.
PETER G. STRATOS
BY George C. Sullivan
Agent

July 2, 1963 P. G. STRATOS 3,096,448

PULSE SAMPLING DEVICE EMPLOYING MODULATED MULTIVIBRATOR TO SLICE LEADING AND TRAILING EDGES OF INPUT

Filed June 6, 1961 2 Sheets-Sheet 2

*INVENTOR.*
PETER G. STRATOS
*BY* George C. Sullivan
Agent

United States Patent Office 3,096,448

Patented July 2, 1963

3,096,448

PULSE SAMPLING DEVICE EMPLOYING MODULATED MULTIVIBRATOR TO SLICE LEADING AND TRAILING EDGES OF INPUT

Peter G. Stratos, San Francisco, Calif., assignor to Lockheed Aircraft Corporation, Burbank, Calif.

Filed June 6, 1961, Ser. No. 115,219

3 Claims. (Cl. 307—88.5)

This invention relates to a pulse sampling device and more particularly to a relatively simple pulse sampling device which generates its own voltage for triggering at the correct time sequences.

In order to store a large quantity of information on a tape recorder it is desirable to operate the tape at the minimum permissible speed. In addition, if the information to be stored is of the rectangular wave type, it is necessary to modulate the information for storage and to reproduce the stored information it is necessary to detect the modulated stored information. Due to the inherent limitations of a tape recorder for storing information of this type, with decrease of tape speed to a predetermined value there will be attenuation of the side band frequencies necessary to reproduce the rectangular wave information. This being the case, the leading and trailing edges of the detected signal deviate from the ideal rectangular wave signal which is generally undesirable. Prior methods for reproducing the rectangular wave have been by means of external synchronous or clock pulses which result in circuits which are relatively complex and are dependent upon an external parameter.

The present invention obviates these disadvantages by employing a pulse sampling circuit which generates its own signal and is therefore independent of external parameters. This is accomplished by applying the detected pulse to the input of a trigger circuit and triggering the trigger circuit by a sine pulse having the same fundamental frequency as the detected pulse. This sine pulse is obtained by amplifying the detected pulse about a bias level, clipping the amplified pulse so that it is virtually a rectangular wave and filtering the rectangular wave at the fundamental frequency thereof thereby providing a sine wave output at the fundamental frequency. The trigger voltage level is selected so there is an output from the trigger circuit only when the detected pulse is at a constant level. In this manner a rectangular wave is produced at the output of the trigger circuit having the same amplitude as the detected pulse.

Accordingly, an object of the present invention is to provide a relatively inexpensive, reliable and simple pulse sampling device.

Another object of the present invention is to provide a pulse sampling device which generates its own trigger voltage and is independent of external clock sources.

Still another object of the present invention is to provide a pulse sampling device which utilizes the pulse to be sampled for generation of a signal which is employed to sample the pulse.

The specific nature of the invention, as well as other objects, uses and advantages thereof, will clearly appear from the following description and from the accompanying drawing in which.

Figures 1, 2:
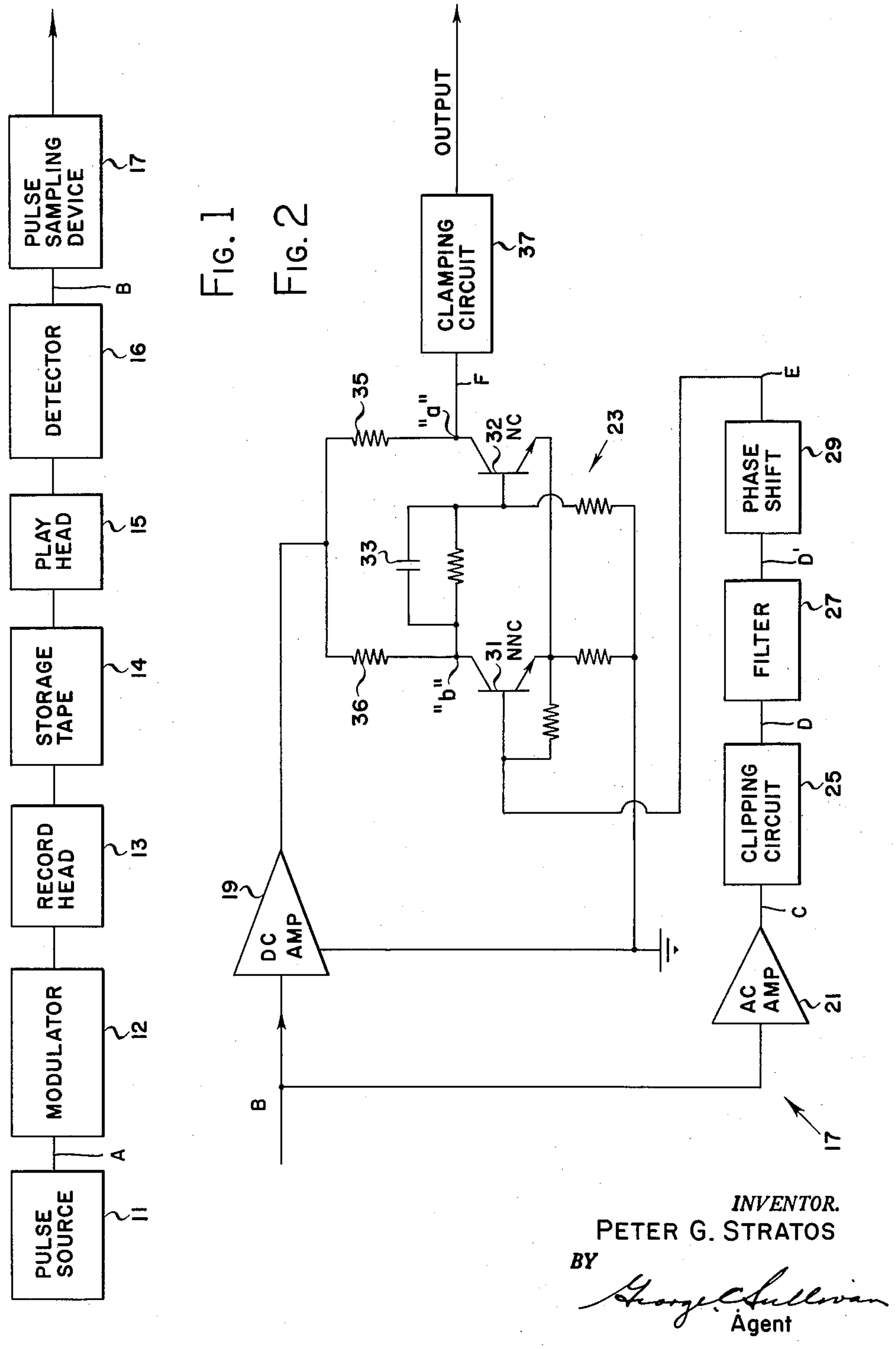
FIGURE 1 is a block diagram of a typical circuit with which the present invention is used.
FIGURE 2 is a schematic diagram illustrating the present invention.
Figure 3A:
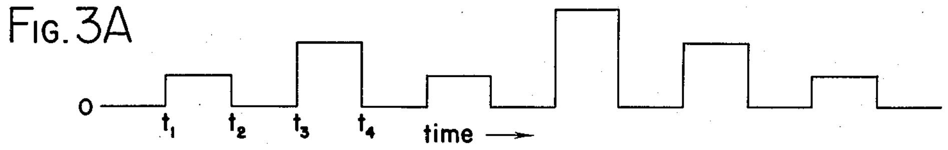
FIGURES 3A through 3F are curves illustrating the operation of the present invention.

In FIGURE 1 is shown a pulse source 11 providing a rectangular wave output signal the amplitude of which may be varied to provide information. Pulse source 11 may comprise a plurality of transducers which measure various parameters and provide D.C. voltage outputs indicative of the measured parameters. These D.C. voltage outputs are then chopped by a switching circuit which, for example, may be a motor driven commutator, thereby providing rectangular wave chopped pulses. The rectangular wave output pulses of pulse source 11 are modulated by modulator 12 and applied to the record head 13 which stores the modulated pulse on storage tape 14. This information is retrieved from storage tape 14 by play head 15 and is demodulated by detector 16 and then applied to the input of pulse sampling device 17 of the present invention. In FIGURE 3A is shown, by way of example, the shape and period of the output pulses which may be obtained from pulse source 11 (point A of FIGURE 1) during a given period of operation. It should be noted that these pulses are rectangular, have a constant period and have varying voltage amplitudes above a reference zero voltage level. It is desirable that the output of detector 16 reproduce the pulse train shown in FIGURE 3A. However, due to the inherent limitations of the record and play heads, modulator and detector, the output of detector 16 (point B of FIGURES 1 and 2) may provide a pulse train similar to that shown in FIGURE 3B. In the instance when amplitude modulation is employed, for example, the slope of the leading and trailing edges of these pulses are primarily due to either attenuation of the side band frequencies when a high frequency modulator is used due to the bandwidth limitations of the recorder, or reproduction of the slope of the modulator signal when a low frequency modulator is used. The desired information of each pulse is the amplitude whereas the width or time duration thereof is relatively unimportant. As will hereinafter become apparent, the function of the present invention is to pass only that portion of the pulses shown in FIGURE 3B that does not vary as a function of time, that is, to cut off that portion of the pulses that slope, resulting in rectangular waves having the same amplitude but of slightly shorter time duration as shown in FIGURE 3F.

In FIGURE 2 is illustrated the pulse coupling device of the present invention as denoted generally by reference numeral 17. The input to this circuit is from detector 16 or a similar pulse source and is applied to the input of D.C. amplifier 19 and to the input of A.C. amplifier 21. Amplifier 19 may have a variable gain and provides a D.C. reference level to which the incoming pulses are added thereby providing bias voltage for the transistors of trigger circuit 23. The gain of amplifier 19 is selected so the voltage at point *a*, when the trigger circuit is conducting, has the same amplitude above the D.C. reference level as the sampled pulse has above ground. Amplifier 21 is employed to provide a relatively large gain to the incoming pulses about a zero or ground reference level as shown in FIGURE 3C and appear at point C of FIGURE 2. It can be seen that with sufficiently large gain, the slopes of the leading and trailing edges of the amplified pulses become large and approach rectangular wave configuration. The output of A.C. amplifier 21 is applied to clipping circuit 25 which clips that portion of the amplified pulses having magnitudes greater than $+E_1$, and $-E_1$, as illustrated in FIGURES 3C and 3D and appear at point D at FIGURE 2. The dotted lines of FIGURE 3C illustrate the potentials at which clipping circuit 25 is set to clip the amplified incoming pulses and the dotted line in FIGURE 3D illustrates the shape and magnitude of the output pulses (point D at FIGURE 2) from clipping circuit 25. It should be particularly noted that the time shift between the start of the pulses shown in FIGURE 3B and the time when the pulses of FIGURES 3C and 3D cross the zero reference is relatively small since the amplification factor is relatively large.

Filter 27 is tuned to the fundamental frequency of the square wave output of clipping circuit 25 resulting in a sine wave output of the fundamental frequency as represented by the sine wave of FIGURE 3D and appearing at point D′ of FIGURE 2. As shown in FIGURE 3D some phase shift results between the rectangular wave output pulses from clipping circuit 25 and the sine wave output from low pass filter 27. However, this phase shift may be corrected by employing phase shift circuit 29 which shifts the phase of the sine signal to correspond with the sampled or incoming pulses as illustrated in FIGURE 3E and appears at point E at FIGURE 2.

The output of phase shift circuit 29 is applied to the base of transistor 31 of trigger circuit 23. The trigger voltage is selected so that transistor 31 is rendered conducting when the singal applied to the base thereof has a value $E_2$ as illustrated in FIGURE 3E. When transistor 31 is rendered conducting, transistor 32 is rendered nonconducting since the voltage applied to the base thereof drops below the trigger level. Capacitor 33 is provided to rapidly transfer the voltage change at point *b* to the base of transistor 32. During that period when transistor 32 is nonconducting the voltage at point *a* is nearly the same as at the output of D.C. amplifier 19. There will be a slight voltage drop cross resistor 35 due to the current drawn by the output load; however, the gain of D.C. amplifier may be adjusted so the pulse amplitude at point *a* will be the same as the amplitude of the incoming pulse. Trigger circuit 23 is provided with a regenerative feedback interconnecting the emitter of transistor 32 with the base of transistor 31 in order to realize rapid changes of state.

It can therefore be seen that when the trigger voltage at the base of transistor 31 is greater than $E_2$, that transistor 31 is conducting and transistor 32 is nonconducting and when the voltage at the base of transistor 31 is less than $E_2$ that transistor 31 is nonconducting and transistor 32 is conducting since the voltage at point *b* and at the base of transistor 32 is greater than the switching or threshold voltage. It should be noted that the positive D.C. bias level, to which the incoming pulses are added by D.C. amplifier 19, is of sufficient value to render transistor 32 conducting when transistor 31 is nonconducting but is of insufficient value, due to the large voltage drop across resistor 36, to render transistor 32 conducting when transistor 31 is conducting.

Figure 3B:
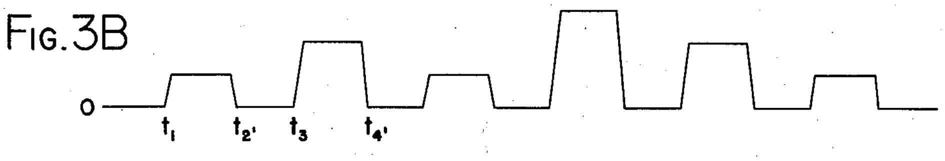
Figure 3C:
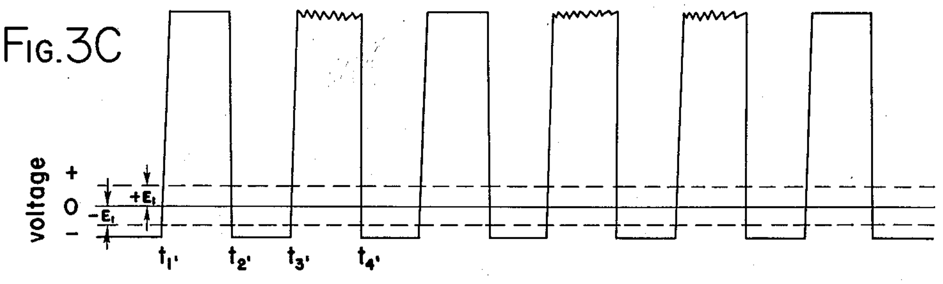
Figure 3D:
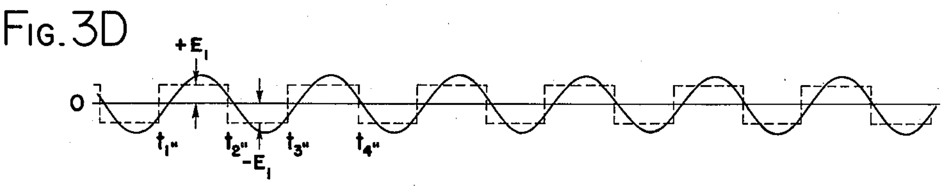
Figure 3E:
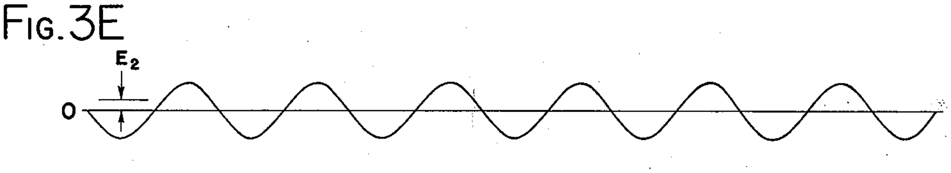
Figure 3F:
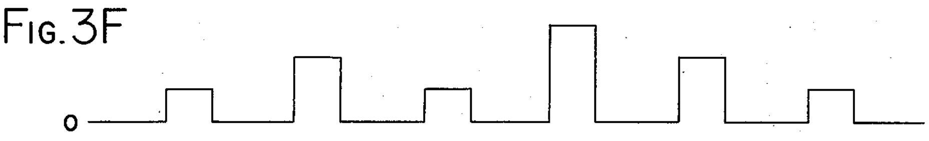

By considering FIGURES 3B and 3E it can be seen the leading and trailing edges of the incoming pulses shown in FIGURE 3B are clipped with the resulting rectangular wave pulses having the same amplitude but of slightly shorter duration than the incoming pulses as shown in FIGURE 3F and appears at point F of FIGURE 2.

The output of trigger circuit 23 is applied to a conventional clamping circuit 37 which restores the clipped rectangular wave pulses to a reference ground potential by removing the D.C. bias level introduced by D.C. amplifier 19.

It is to be understood in connection with this invention that the embodiment shown are only exemplary, and that various modifications can be made in construction and arrangement within the scope of the invention as defined in the appended claims.

What is claimed is:

1. A pulse train sampling device for clipping the leading and trailing edges and transmitting the remaining portion of each pulse in a pulse train comprising a switching device, means applying said train of pulses to the input of said switching device, means for converting said train of pulses into a train of sinusoidal signals having a period and phase which approximately corresponds with the period and phase of said train of pulses, means for applying said train of sinusoidal signals to said switching device, said switching device beings actuated by said sinusoidal signals when the potential of each sinusoidal signal is above a predetermined magnitude thereby permitting transmission by said switching device of only said remaining portion and clipping said leading and trailing edges of each pulse of said pulse train.

2. The device of claim 1 wherein said second mentioned means includes an alternating current amplifier, a clipping circuit and a filter respectively connected in series.

3. The device of claim 2 wherein said clipping circuit includes means which permits only a relatively small portion of the output of said alternating current amplifier to be transmitted to said filter.

References Cited in the file of this patent

UNITED STATES PATENTS

| | | |
|---|---|---|
| 2,399,668 | Francis | May 7, 1946 |
| 2,985,836 | Hatton | May 23, 1961 |
| 3,011,076 | Paradise | Nov. 28, 1961 |
| 3,060,326 | Watson | Oct. 23, 1962 |

OTHER REFERENCES

Transistor Electronics, by Lo et al., 1955, Prentice-Hall Inc., page 502, FIG. 12–64.